(12) United States Patent
Nelson

(10) Patent No.: US 10,653,126 B2
(45) Date of Patent: May 19, 2020

(54) HANDS FREE DEHOOKING DEVICE

(71) Applicant: Brady J. Nelson, Palmetto, FL (US)

(72) Inventor: Brady J. Nelson, Palmetto, FL (US)

(73) Assignee: Overboard LLC, Holmes Beach, FL (US)

( * ) Notice: Subject to any disclaimer, the term of this patent is extended or adjusted under 35 U.S.C. 154(b) by 611 days.

(21) Appl. No.: 15/139,409

(22) Filed: Apr. 27, 2016

(65) Prior Publication Data

US 2018/0007885 A1    Jan. 11, 2018

(51) Int. Cl.
 *A01K 97/18*    (2006.01)
(52) U.S. Cl.
 CPC .................................... *A01K 97/18* (2013.01)
(58) Field of Classification Search
 CPC ................................ A01K 97/18; A01K 97/20
 See application file for complete search history.

(56) References Cited

U.S. PATENT DOCUMENTS

| | | | | |
|---|---|---|---|---|
| 2,215,275 A | * | 9/1940 | Philips | A01K 97/18 43/53.5 |
| 2,348,662 A | | 5/1944 | Stevens | |
| 2,503,420 A | * | 4/1950 | Shamel | A01K 97/18 43/53.5 |
| 2,662,331 A | * | 12/1953 | Borup | A01K 97/18 43/53.5 |
| 2,892,284 A | * | 6/1959 | Shawhan | A01K 97/18 43/53.5 |
| 2,918,747 A | * | 12/1959 | Terlecky | A01K 97/18 43/53.5 |
| 3,019,547 A | | 2/1962 | Felts | |
| 3,034,252 A | * | 5/1962 | Basinski | A01K 97/18 43/53.5 |
| D227,759 S | * | 7/1973 | Enagureto | D22/150 |
| 4,914,853 A | | 4/1990 | Swindle | |
| 5,274,948 A | | 1/1994 | Harrison et al. | |
| 5,644,865 A | * | 7/1997 | Harrison | A01K 97/18 43/53.5 |
| 6,138,401 A | | 10/2000 | Duncan | |
| 6,389,731 B1 | * | 5/2002 | Freeman | A01K 97/18 43/4 |
| 6,453,601 B1 | | 9/2002 | Duncan | |
| 6,694,664 B1 | | 2/2004 | Knight | |
| 6,772,554 B1 | * | 8/2004 | Boone | A01K 97/18 43/54.1 |
| 6,840,002 B1 | | 1/2005 | Dick | |

(Continued)

FOREIGN PATENT DOCUMENTS

| | | |
|---|---|---|
| DE | 10103628 | 8/2002 |
| JP | 2005143416 | 6/2005 |
| JP | 2009136268 | 6/2009 |

*Primary Examiner* — Kathleen I Alker
(74) *Attorney, Agent, or Firm* — Edward M. Livingston, Esq.; Bryan L. Loeffler, Esq.; Livingston Loeffler, P.A.

(57) ABSTRACT

A stationary hands free fish dehooking device (1) used for safely removing hooks and lures from a fish's mouth and/or body. The hands free dehooking device has a rigid ring (2) located on an end of an elongated arm (3) that is mounted to a fixed or stationary object (6), such as a box (8), boat (7), or other object that anchors the ring and arm in a fixed position for use. The ring and arm may also be rotatable so the hands free dehooking device may be rotated into a stored position or an operating position.

9 Claims, 5 Drawing Sheets

(56) References Cited

U.S. PATENT DOCUMENTS

| | | |
|---|---|---|
| 7,818,914 B1 | 10/2010 | Baiamonte et al. |
| 9,485,979 B1 * | 11/2016 | Kangatharalingam ........................ A01K 97/18 |
| 10,188,089 B2 * | 1/2019 | Muehlenthaler ....... A01K 97/18 |
| 2009/0229167 A1 | 9/2009 | Doss |
| 2010/0132243 A1 | 6/2010 | Dick |
| 2011/0258902 A1 * | 10/2011 | Cason .................... A01K 97/18 43/17.2 |

* cited by examiner

HANDS FREE DEHOOKING DEVICE

FIELD OF THE INVENTION

This invention relates to devices used for removing hooks from fish and other aquatic life and more particularly, a stationary dehooking device that is mounted in a fixed location, thereby making the dehooking device hands free.

BACKGROUND OF THE INVENTION

There are many circumstances when a fisherman catches a fish and needs to safely remove a hook from the fish without causing harm to the fish. One circumstance is when a fish is caught and is too immature and/or small to keep. In most of these cases, fisherman are required by law to return the fish to the water. Another circumstance is when fisherman fish using the practice of "catch and release," wherein fish are only caught for the sport of catching the fish and the fisherman has no intention of keeping the fish. An additional circumstance is when a fisherman catches an undesirable fish or other aquatic life that is un-edible and/or dangerous to handle.

In any of these cases, the fisherman must be careful not to injure himself/herself and/or the fish while removing the fishing hook from the fish.

Often a fish hook is removed or dehooked from a fish with pliers. This method requires the fish to be lifted out of the water and held while the pliers are used to pry the hook out of the fish's mouth. This method puts extra stress on the fish and often tears more tissue than necessary to remove the hook. In addition, this method requires that the fisherman touch the fish which could harm the fish's scales and/or fins to such an extent that the fish will not survive after being returned to the water.

Current dehooking devices available to anglers are handheld devices that require the fisherman to bring the fish onto shore and/or onto a boat to remove the hook. These handheld devices also require the fisherman to relinquish control of the fishing pole and/or for a second person to be present to assist in the removal of the hook. All of these factors contribute to a higher probability of the fisherman and/or the fish being unnecessarily injured during the hook removal process.

Therefore, the need exists for a dehooking device that is mounted in a fixed location, thereby making the dehooking device hands free.

The relevant prior art includes the following references:

| Pat. No. | Inventor | Issue/Publication Date |
|---|---|---|
| (U.S. Patent References) | | |
| 2,348,662 | Stevens | May 9, 1944 |
| 3,019,547 | Felts | Feb. 6, 1962 |
| 4,914,853 | Swindle | Apr. 10, 1990 |
| 5,274,948 | Harrison et al. | Jan. 4, 1994 |
| 6,453,601 | Duncan | Sep. 24, 2002 |
| 6,694,664 | Knight | Feb. 24, 2004 |
| 6,840,002 | Dick | Jan. 11, 2005 |
| 2009/0229167 | Doss | Sep. 17, 2009 |
| 6,138,401 | Duncan | Oct. 31, 2000 |
| 2010/0132243 | Dick | Jun. 3, 2010 |
| 7,818,914 | Baiamonte et al. | Oct. 26, 2010 |

| Pat. No. | Inventor | Issue/Publication Date |
|---|---|---|
| (Foreign Patent References) | | |
| DE10103628 | N/A | Aug. 1, 2002 |
| JP2005143416 | N/A | Jun. 9, 2005 |
| JP2009136268 | N/A | Jun. 25, 2009 |

SUMMARY OF THE INVENTION

The primary object of the present invention is to provide a stationary fish dehooking device that is mounted in a fixed location, thereby making the dehooking device hands free.

The present invention fulfills the above and other objects by providing a stationary hands-free fish dehooking device used for safely removing hooks and lures from a fish's mouth and/or body. The present invention comprises a rigid ring located on an end of an arm that is mounted to a fixed object, such as a box, boat, or other object that anchors the ring in a fixed position for use. The ring preferable comprises an opening through which a user may slip a fishing line into the center of the ring. The ring is preferably mounted in a horizontal position so that when the user pulls upward on the fishing line, a hook and fish located on a distal end of the line comes into contact with the ring, thereby causing the hook to become dislodged from the fish and the fish to fall back into the water or into a storage container, depending on the position of the dehooking device.

The dehooking device may be mounted over or in a storage container. Alternatively, the dehooking device may be mounted on or near the edge of a boat so the arm and ring extend over the water. This allows the fish to be removed from the hook without a user touching the fish which can cause physical damage to the fish and in some cases the fish to die shortly after being released. In one embodiment of the present invention, the dehooking device may be mounted to a boat railing on a motor boat or to a kayak or similar boat via a swiveling mount that allows a user to rotate the dehooking device from a stored position to an operating position.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
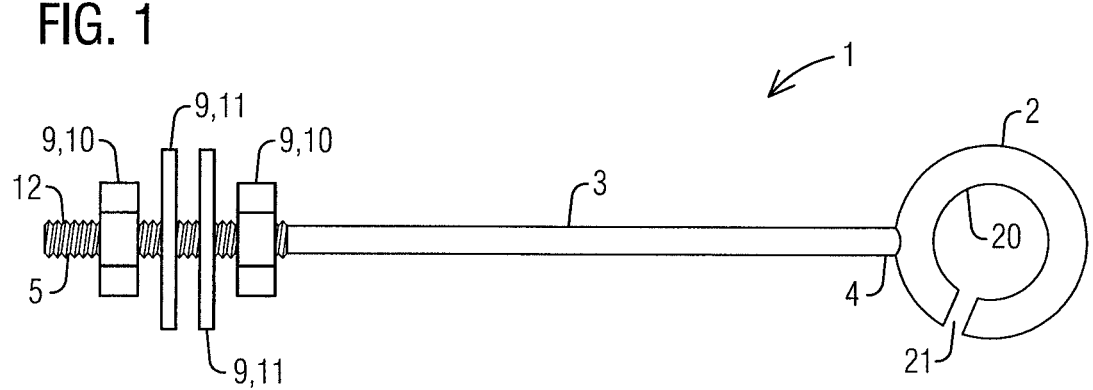
FIG. 1 is a perspective top view of a hands free dehooking device of the present invention
Figure 2:
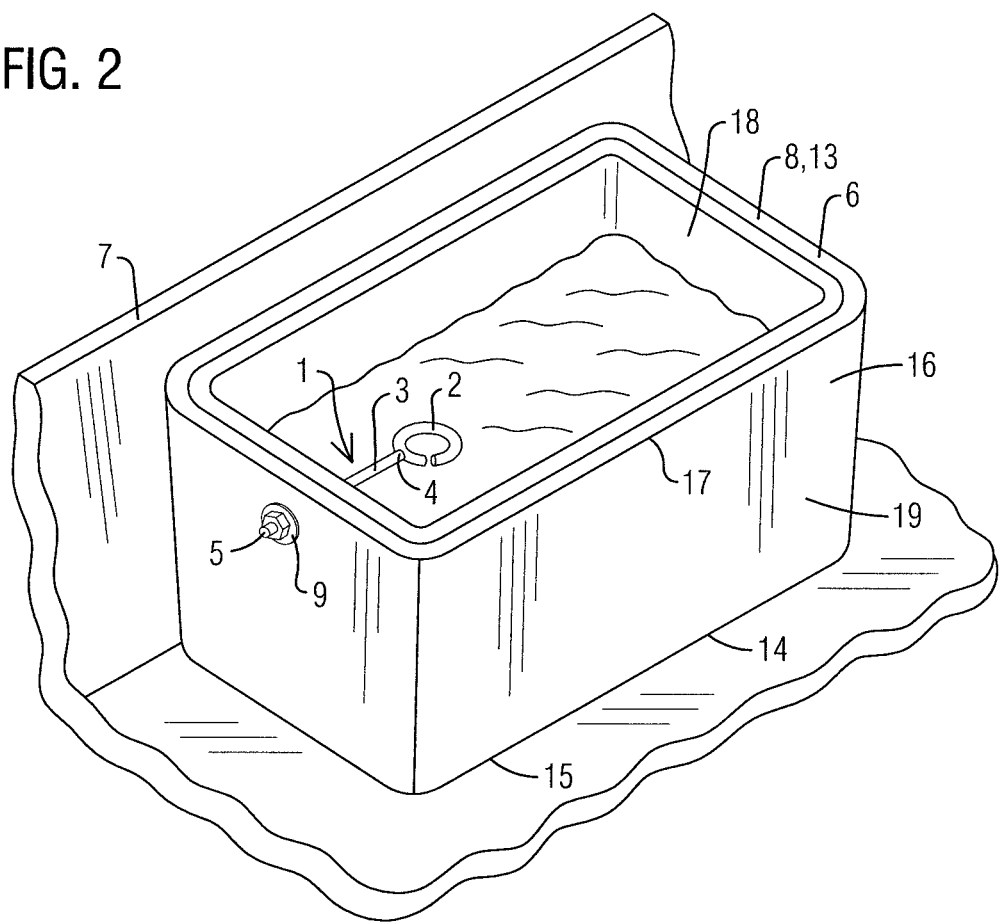
FIG. 2 is a perspective top partial cutaway view of a storage box or live well on a boat having a hands free dehooking device of the present invention installed therein.

For purposes of describing the preferred embodiment, the terminology used in reference to the numbered components in the drawings is as follows:

1. hands free dehooking device, generally
2. ring
3. arm
4. distal end of arm
5. proximal end of arm
6. stationary base
7. boat
8. storage box
9. mounting means
10. nut
11. washer
12. threaded portion
13. live well
14. floor panel of storage box
15. perimeter edge of floor panel
16. perimeter wall of storage box
17. upper edge of perimeter wall
18. inner surface of perimeter wall
19. outer surface of perimeter wall
20. central aperture of ring
21. slot
22. fishing line
23. X-Y axis
24. fish
25. hook
26. distal end of fishing line
27. water
28. tubular base
29. top end of tubular base
30. upper portion of tubular base
31. bottom end of tubular base
32. lower portion of tubular base
33. fishing pole holder
34. mountable stationary base
35. rotating post
36. bottom surface of mountable stationary base
37. side surface of mountable stationary base
38. top surface of mountable stationary base
39. attachment means
40. screw
41. hub
42. opening of hub
43. locking means
44. groove
45. ridge
46. stud
46A. first stud
46B. second stud
47. aperture
48. locking post
49. stop
50. recessed portion With reference to FIGS. 1 and 2, a perspective top view of a hands free dehooking device 1 of the present invention and a perspective top partial cutaway view of a storage box 8 or live well 13 on a boat having a hands free dehooking device 1 of the present invention installed therein, respectively, are illustrated. The hands free dehooking device 1 of the present invention comprises a preferably rigid ring 2 located on a distal end 4 of an elongated arm 3. A proximal end 5 of the arm 3 is preferably mounted to an object 6, such as a boat 7, dock, storage box 8, cooler, base or any other object that anchors the hands free dehooking device 1 in place and allows an individual to use the hands free dehooking device 1 in a hands free manner. The hands free dehooking device 1 is mounted to the object 6, via at least one mounting means 9 that secures the proximal end 5 of the elongated arm 3 to the object 6. As illustrated in FIG. 1, the mounting means 9 comprises at least one nut 10 and at least one washer 11 secured to a threaded portion 12 of the hands free dehooking device 1. The at least one mounting means 9 may also comprise a bolt, bracket, screw, adhesive, rivet, clamp and so forth. The dehooking device 1 is mounted to a storage box 8 for storing caught fish, such as a cooler, live well 13, bucket and so forth, via a threaded portion 12 located on the proximal end 5 of the arm 3 of the dehooking device 1 and washers 11 and nuts 10 that engage the threaded portion 12. The storage box 6 comprises a floor panel 14 having a perimeter edge 15 from which at least one perimeter wall 16 extends upward perpendicularly a predetermined distance terminating at an upper edge 17. Said perimeter wall 16 comprises and inner surface 18 and an outer surface 19. The ring 2 and arm 3 are preferably mounted in a horizontal position in relation to the floor panel 14 of the storage box 6. The dehooking device may have a foldable arm 3, telescoping arm 3 and/or an interchangeable arm 3 that allows a user adjust the length of the dehooking device 1 according to the object 6 it is being mounted to.

The positioning of the dehooking device 1 on the inner surface 18 of the at least one perimeter wall 16 allows a fish to drop directly into the storage box 6 after a hook is removed from the fish. The ring 2 surrounds central aperture 20. A slot 21 is located in the ring allows a user to insert a fishing line 22 through the ring 2 and into the central aperture 20.

Figure 3:
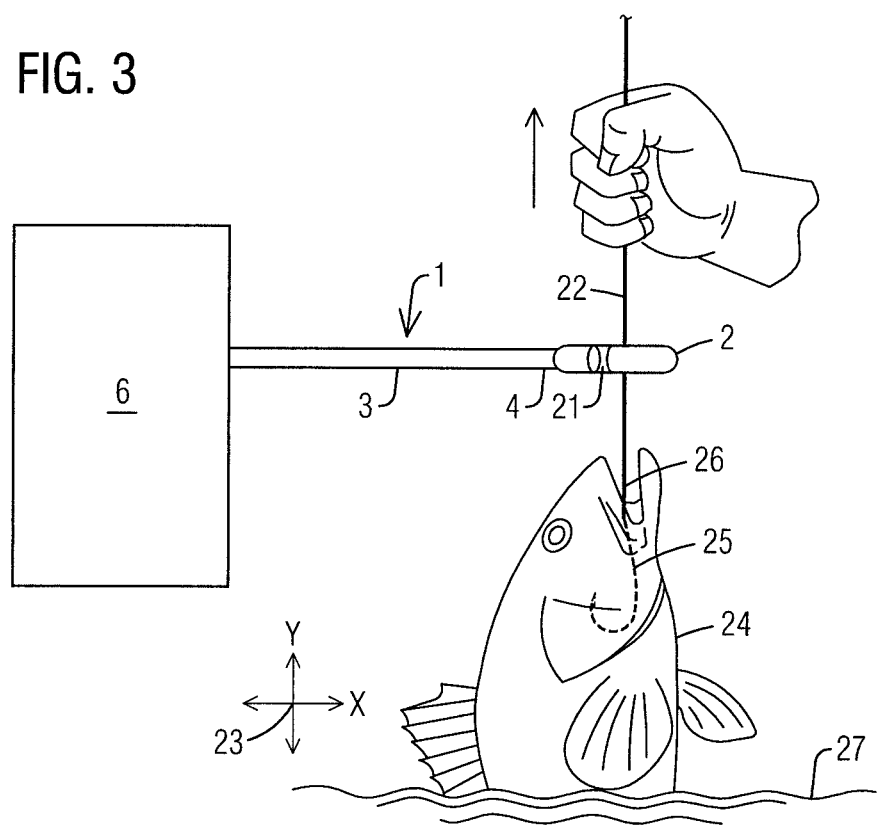
FIG. 3 is a side view of a hands free dehooking device of the present invention mounted to a stationary base and in use.
Figure 4:
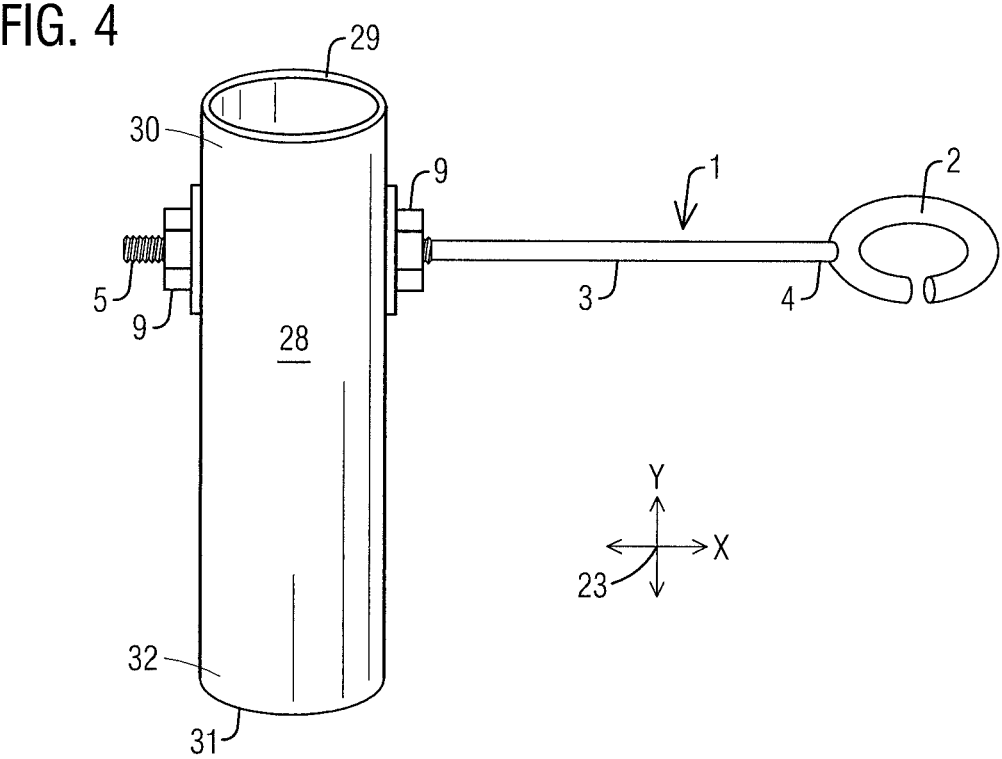
FIG. 4 is a side view hands free dehooking device of the present invention having a tubular-shaped base.
Figure 5:
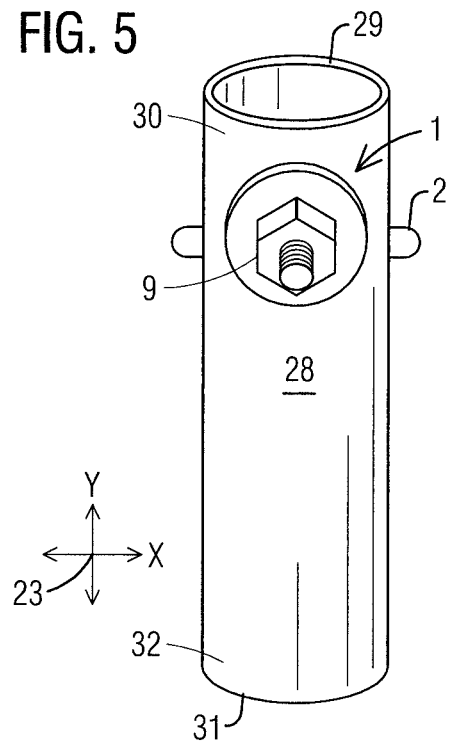
FIG. 5 is a rear view hands free dehooking device of the present invention having a tubular-shaped base in a vertical position.
Figure 6:
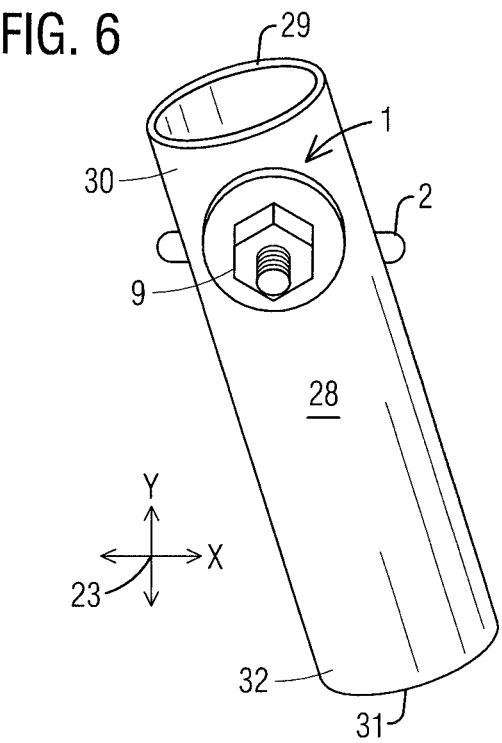
FIG. 6 is a rear view hands free dehooking device of the present invention having a tubular-shaped base in an angled position.

With reference to FIG. 3, a side view of a hands free dehooking device 1 of the present invention mounted to a stationary base 6 in use is illustrated. A slot 21 located in the ring allows a user to insert a fishing line 22 through the ring 2 and into the central aperture 20 of the ring 2 so that the fishing line 22 is in substantially perpendicular position to the arm 3 and the ring 2 when the fishing line 22 is held in an upright position over the ring 2 (as compared to an X-Y axis 23), while being weighed down with a fish 24 caught on a hook 25 located on a distal end 26 of the fishing line 22 located below the ring 2. When the user pulls upward on the fishing line 22, the hook 25 and fish 24 located on the distal end 26 of the fishing line 22 comes into contact with the ring 2, thereby causing the fishing hook 25 to become dislodged from the fish 24. The fish 24 will then fall into the water 27 below.

Figure 7:
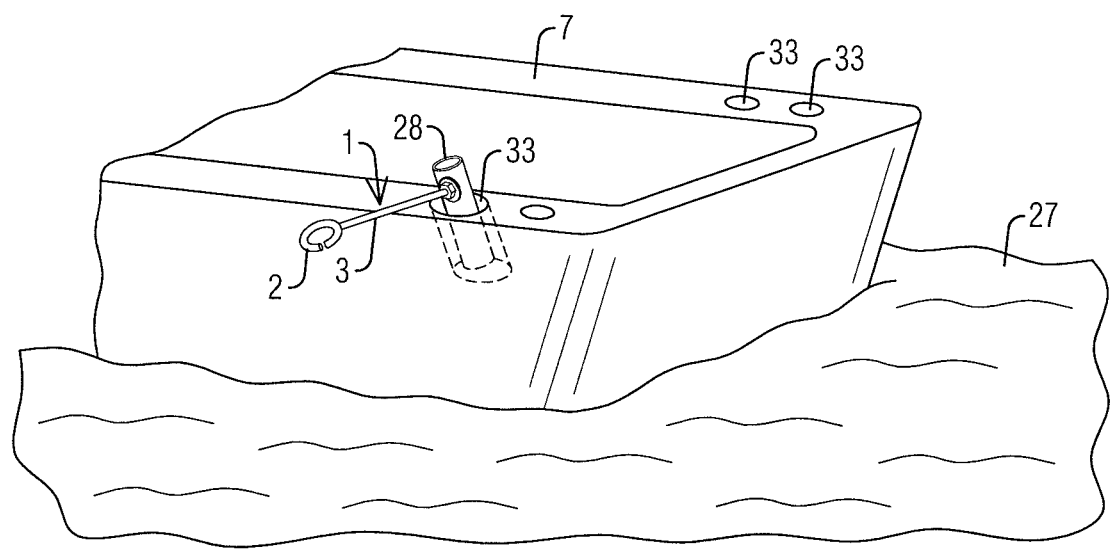
FIG. 7 is a rear view hands free dehooking device of the present invention having a tubular-shaped base in use on a boat.

With reference to FIGS. 4-7, various views of a hands free dehooking device 1 of the present invention having a tubular-shaped base 28 are illustrated. The dehooking device 1 of the present invention may be mounted on or near the edge of a boat 7 so the arm 3 and ring 2 extend over the water 27 when in use, as illustrated in FIG. 7. This allows fish to be removed from the hook and released directly back into the water 27 without a user touching the fish, which can cause physical damage to the fish and in some cases the fish to die shortly after being released. As illustrated here, the hands free dehooking device 1 of the present invention comprises a preferably rigid ring 2 located on a distal end 4 of an elongated arm 3. A proximal end 5 of the arm 3 is mounted to a tubular-shaped base 28 either integrally or via at least one mounting means 9. The tubular-shaped base 28 comprises a top end 29 having an upper portion 30 of the tubular-shaped base 28 located proximal thereto and a bottom end 31 having a lower portion 32 of the tubular-shaped base 28 located proximal thereto. The proximal end 5 of the arm 3 extends perpendicularly from the upper portion 30 of the tubular-shaped shaped base 28, thereby allowing the lower portion 32 of the tubular-shaped base 28 to be inserted into a fishing rod holder 33 located on a boat 7, as illustrated in FIG. 7.

The angle of the tubular-shaped base 28 is preferably adjustable in relation to the arm 3 to allow the tubular-shaped base 28 to be inserted into a vertical fishing pole holder 33 or an angled fishing pole holder 33 while the arm 3 and ring 2 are adjusted to maintain a parallel position (as compared to an X-Y axis 23) in relation to the water 27 over which the arm 3 and ring 2 extend.

Figure 8:
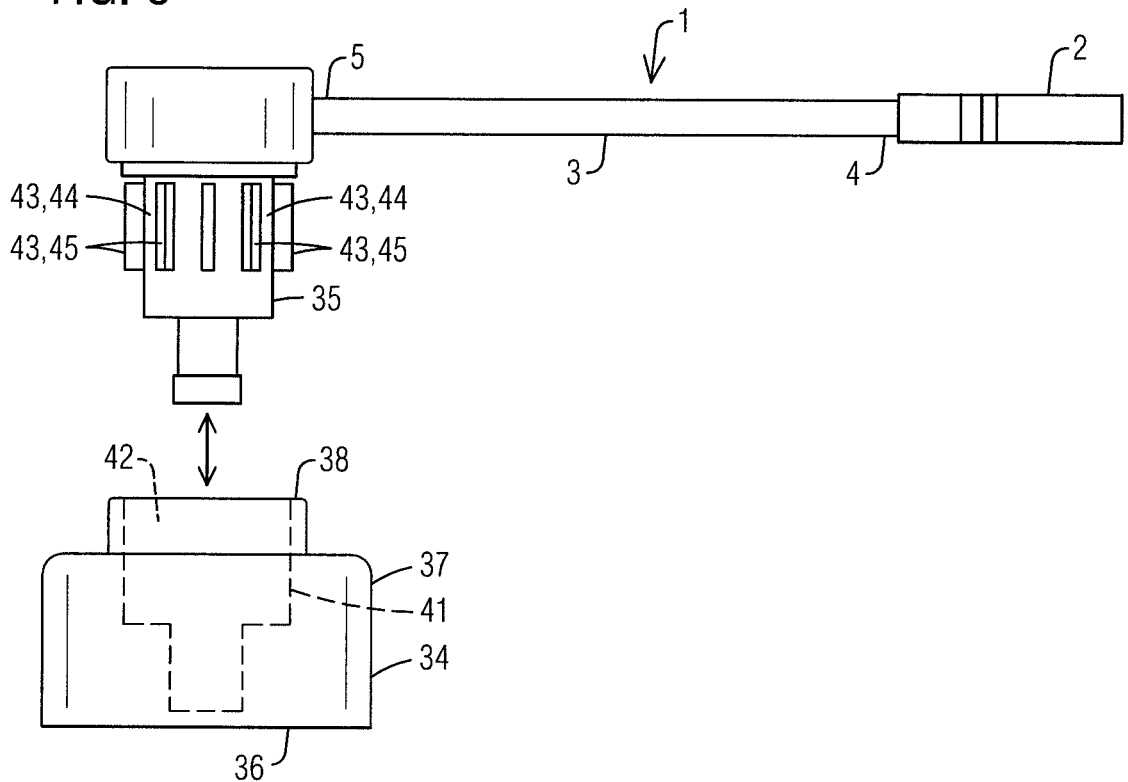
FIG. 8 is an exploded side plan view of a hands free dehooking device of the present invention having a mountable stationary base.
Figure 9:
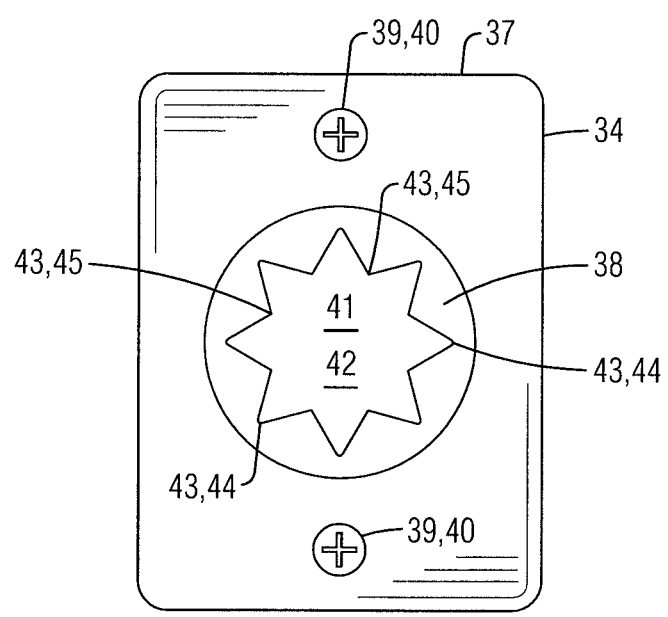
FIG. 9 is a top view of a mountable stationary base of the present invention.

With reference to FIGS. 8 and 9, an exploded side plan view of a hands free dehooking device 1 of the present invention and a top view of a mountable stationary base 34 of the present invention, respectively, are illustrated. The hands free dehooking device 1 of the present invention comprises a preferably rigid ring 2 located on a distal end 4 of an elongated arm 3. A rotating post 35 is located on a proximal end 5 of the arm 3 and is perpendicular to the arm 3, thereby creating an L-shape. The hands free dehooking device 1 comprises a mountable stationary base 34 that attaches to the rotating post 35. The mountable stationary base 34 comprises a bottom surface 36, at least one side surface 37 and a top surface 38. The mountable stationary base 34 attaches to a surface, such as a surface of a kayak or boat railing, via at least one attachment means 39, such as a nut, bolt, washer, screw 40, adhesive, rivet and so forth.

The rotating post 35 is inserted and housed within a hub 41 or tubular-shaped aperture located within the mountable stationary base 34. The hub 41 comprises an opening 42 on the top surface 38 of the mountable stationary base 34 to allow for insertion of the rotating post 35 into the hub 41. This allows the arm 3 and ring 2 to be rotated outward over the side of a kayak or boat and over the water into an operating position. A locking means 43, such as at least one groove 44 and/or at least one ridge 45 may be located on the hub 41 and/or the rotating post 35 to lock the arm 3 and ring 2 into a desired position.

Figure 10:
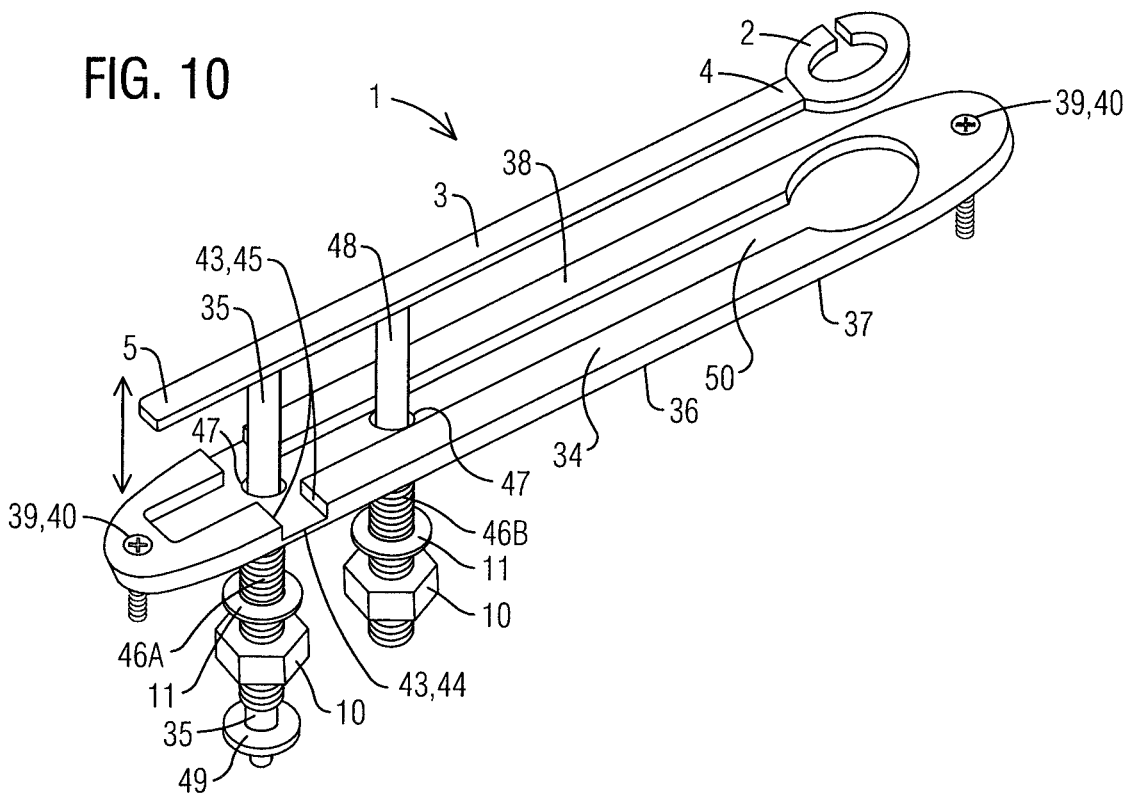
FIG. 10 is a perspective top view of a flush mount hands free dehooking device of the present invention in a partially stored position.
Figure 11:
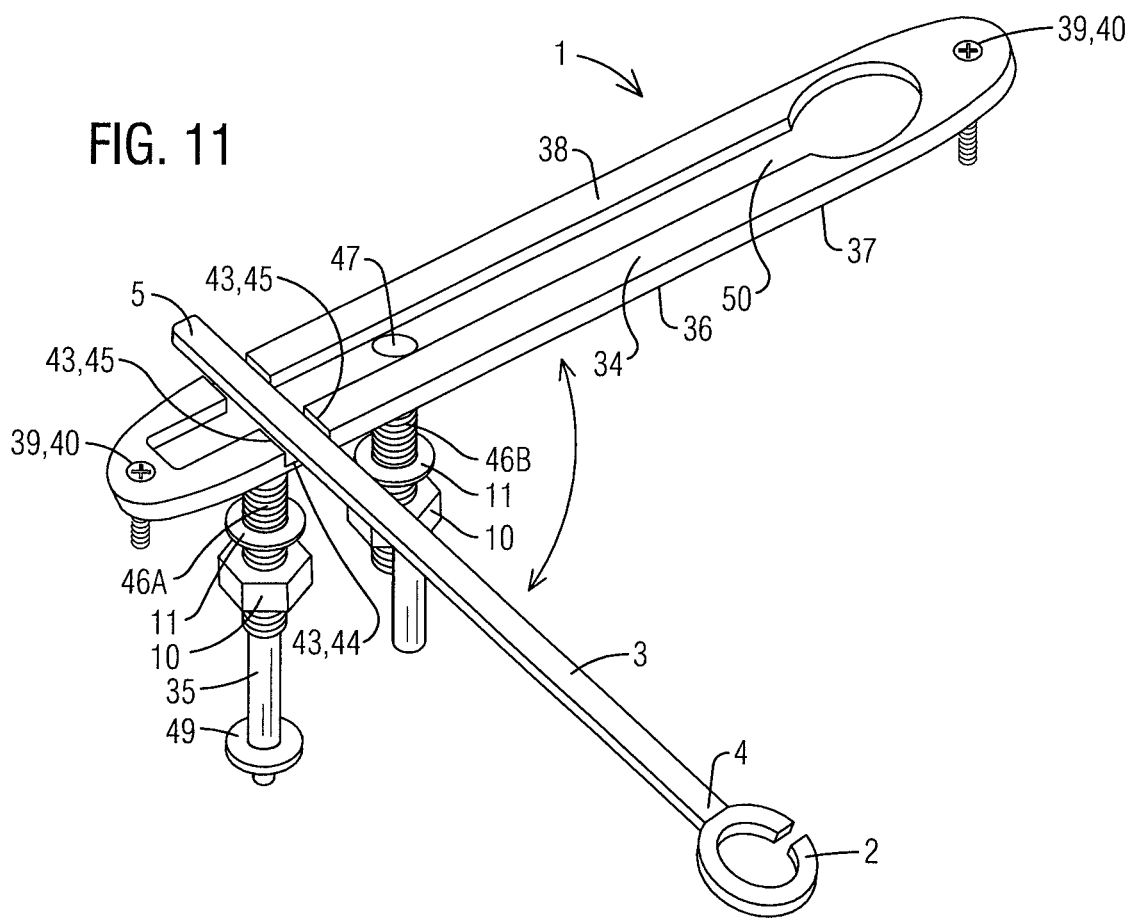
FIG. 11 is a perspective top view of a flush mount hands free dehooking device of the present invention in an operating position.

With reference to FIGS. 10 and 11, a perspective top view of a flush mount hands free dehooking device 1 of the present invention in a partially stored position and a perspective top view of a flush mount hands free dehooking device 1 of the present invention in an operating position, respectively, are illustrated. The hands free dehooking device 1 of the present invention comprises a preferably rigid ring 2 located on a distal end 4 of an elongated arm 3. A rotating post 35 is located on a proximal end 5 of the arm 3 and is perpendicular to the arm 3, thereby creating an L-shape. The hands free dehooking device 1 comprises a mountable stationary base 34 that attaches to the rotating post 35. The mountable stationary base 34 comprises a bottom surface 36, at least one side surface 37 and a top surface 38. The mountable stationary base 34 attaches to a surface, such as a boat railing, via at least one attachment means 39, such as a nut, bolt, washer, screw 40, adhesive, rivet and so forth. As illustrated here, the mountable stationary base 34 comprises two studs 46, which are preferably threaded, that extend downward from the bottom surface 36 mountable stationary base 34. The studs 46 may be inserted into holes drilled into a railing of a boat and secured using washers 11 and nuts 10. The studs 46 are preferably tubular and hollow and assessable from apertures 47 located in the mountable stationary base 34. The rotating post 35 is inserted and housed within a first stud 46A. A locking post 48 extending downward from the arm 3 and which is parallel to the rotating post 35 may be inserted into a second stud 46B. The locking post 48 is preferably shorter than the rotating post 35 to allow the arm 3 to be lifted high enough to disengage the locking post 48 from the second stud 46B while the rotating post 35 remains engaged with the first stud 46A. This allows the arm 3 and ring 2 to be rotated outward over the side of a boat and over water into an operating position. A stop 49 is preferably located on the rotating post 35 to prevent rotating post 35 from being pulled completely out of the first stud 46A. A locking means 43, such as at least one groove 44 and/or at least one ridge 45 may be located on the mountable stationary base 34 and/or in the first stud 46A, to lock the arm 3 into a perpendicular position in relation to the mountable stationary base 34 (either over the water or over the deck of the boat) while the dehooking device 1 is in an operating position, as illustrated in FIG. 11. The arm 6 may be sectional, folding, removable and or telescoping, to allow the dehooking device 1 to be used as a cleat for tying off ropes.

The mountable stationary base 34 preferably has a recessed portion 50 that the arm 3 and ring 2 rest in while in a stored position. This creates a substantially flush surface between the mountable stationary base 34, arm 3 and ring 2, thereby reducing the chance of individuals tripping or becoming caught on the hands free dehooking device 1 when not in use.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A hands free dehooking device for removing hooks from fish comprising:
   a ring located on a distal end of an elongated arm;
   said arm having a proximal end;
   said ring surrounding a central aperture;
   a slot located in the ring to allow a user to insert a fishing line through the ring and into the central aperture;
   a rotating post extending downward from the arm so that the rotating post is perpendicular to the arm, thereby creating an L-shape; and
   a mountable stationary base having a tubular hollow stud extending therefrom that engages the rotating post in a manner that allows the arm and the ring to be rotated in relation to the mountable stationary base.

2. The hands free dehooking device of claim 1 further comprising:

a mountable stationary base having a hub located therein that engages the rotating post in a manner that allows the arm and ring to be rotated in relation to the mountable stationary base.

3. The hands free dehooking device of claim 2 further comprising:
   at least one locking means located on the rotating post.

4. The hands free dehooking device of claim 2 further comprising:
   at least one locking means located on the mountable stationary base.

5. The hands free dehooking device of claim 1 further comprising:
   at least one locking means located on the rotating post.

6. The hands free dehooking device of claim 5 further comprising:
   at least one locking means located on the mountable stationary base.

7. The hands free dehooking device of claim 6 further comprising:
   said at least one locking means located on the mountable stationary base is a groove that engages the arm when the arm and ring are rotated into an operating postition.

8. The hands free dehooking device of claim 1 further comprising:
   a locking post extending downward from the arm so that the locking post is perpendicular to the arm; and
   a second tubular hollow stud extending downward from the mountable stationary base that engages the locking post when the arm and the ring are rotated into a stored position.

9. The hands free dehooking device of claim 1 further comprising:
   a recessed portion located on the mountable stationary base that engages the arm and the ring while the arm and the ring are in a stored position.

* * * * *